United States Patent
Uchino et al.

(10) Patent No.: US 9,713,187 B2
(45) Date of Patent: Jul. 18, 2017

(54) MOBILE COMMUNICATION METHOD, MOBILE STATION, AND RADIO BASE STATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/033,136

(22) PCT Filed: Oct. 23, 2014

(86) PCT No.: PCT/JP2014/078162
§ 371 (c)(1),
(2) Date: Apr. 29, 2016

(87) PCT Pub. No.: WO2015/064455
PCT Pub. Date: May 7, 2015

(65) Prior Publication Data
US 2016/0255672 A1    Sep. 1, 2016

(30) Foreign Application Priority Data
Oct. 31, 2013    (JP) .................................. 2013-226944

(51) Int. Cl.
*H04W 4/00*    (2009.01)
*H04W 76/02*    (2009.01)
(Continued)

(52) U.S. Cl.
CPC ......... *H04W 76/025* (2013.01); *H04L 5/0032* (2013.01); *H04W 72/042* (2013.01); *H04W 16/32* (2013.01)

(58) Field of Classification Search
CPC .................................. H04L 12/56; H04W 4/06
(Continued)

(56) References Cited

U.S. PATENT DOCUMENTS

| | | | |
|---|---|---|---|
| 2013/0114446 A1* | 5/2013 | Liu | H04W 24/10 370/252 |
| 2014/0269575 A1 | 9/2014 | Zhang et al. | |
| 2014/0335872 A1* | 11/2014 | Yamada | H04W 24/04 455/450 |

FOREIGN PATENT DOCUMENTS

| WO | 2013075602 A1 | 5/2013 |
|---|---|---|
| WO | 2014/163349 A1 | 10/2014 |

OTHER PUBLICATIONS

Extended European Search Report in counterpart European Patent Application No. 14856831.4, dated Sep. 9, 2016 (8 pages).
(Continued)

*Primary Examiner* — Iqbal Zaidi
(74) *Attorney, Agent, or Firm* — Osha Liang LLP

(57) ABSTRACT

An overhead for signaling in starting "Bearer split" in "Inter-eNB CA" is reduced. A mobile communication method according to the present invention includes the steps of: transmitting, a first radio base station eNB #1, an identifier of a radio base station eNB #2 and "Config copy indication", to a mobile station UE, "Config copy indication" instructing the mobile station UE to replicate "configuration" of a bearer #1, when the radio base station eNB #1 in a state where the bearer #1 is established with the mobile station UE determines to establish a bearer #2 between the mobile station UE and the radio base station eNB #2; and establishing, by the mobile station UE, the bearer #2 having the same "configuration" with "configuration" of the bearer #1 between the radio base station eNB
(Continued)

2 and the mobile station UE in accordance with the identifier of the radio base station eNB #2 and "Config copy indication".

4 Claims, 5 Drawing Sheets

(51) Int. Cl.
  *H04L 5/00* (2006.01)
  *H04W 72/04* (2009.01)
  *H04W 16/32* (2009.01)
(58) Field of Classification Search
  USPC .................................. 370/328–468; 455/404
  See application file for complete search history.

(56) References Cited

OTHER PUBLICATIONS

International Search Report issued in PCT/JP2014/078162 mailed on Jan. 27, 2015 (1 page).
Written Opinion of the International Searching Authority issued in PCT/JP2014/078162 mailed on Jan. 27, 2015 (4 pages).
ITRI; "Discussion on DRX for Inter Node Radio Resource Aggregation"; 3GPP TSG RAN WG2 #83bis, R2-133105; Ljubljana, Slovenia; Oct. 7-11, 2013 (3 pages).
Huawei, HiSilicon; "Throughput results for inter-frequency deployment of small cells"; 3GPP TSG-RAN WG2 Meeting #82, R2-131782; Fukuoka, Japan; May 20-24, 2013 (5 pages).

\* cited by examiner

MOBILE COMMUNICATION METHOD, MOBILE STATION, AND RADIO BASE STATION

TECHNICAL FIELD

The present invention relates to a mobile communication method, a mobile station, and a radio base station.

BACKGROUND ART

In LTE (Long Term Evolution), RLC (Radio Link Control) layers on a transmitting side and receiving side are configured to execute window controls to provide an order control and a duplicate control.

In the window control of the RLC layer on the transmitting side, an SN (Sequence Number) is assigned to an RLC-PDU (Radio Link Control-Protocol Data Unit) to be newly transmitted. Also, the RLC layer on the transmitting side updates "Tx window (transmitting side window)" or performs retransmission in the RLC layer depending on an RLC-status-report (ACK/NACK) from the RLC layer on the receiving side.

On the other hand, for the window control of the RLC layer on the receiving side, "Rx window (receiving side window)" is updated when successfully receiving the RLC-PDU in order of the SN.

If failing to receive the RLC-status-report from the RLC layer on the receiving side, the RLC layer on the transmitting side cannot update "Tx window (transmitting side window)" nor transmit a new RLC-PDU due to the occurrence of "Tx window stalling".

To avoid this, the RLC layer on the receiving side needs to transmit the RLC-status-report to the RLC layer on the transmitting side at proper frequency.

Note that the RLC layer on the receiving side is configured to transmit the RLC-status-report in a case such as receiving a feedback request (which is transmitted periodically or at the end of RLC-PDU) from the RLC layer on the transmitting side, or detecting an SN being lost from the received RLC-PDUs.

In this connection, the RLC layer on the receiving side is configured not to transmit the RLC-status-report when "prohibit timer" is activated.

Such "Prohibit timer" is configured to be activated at a time of the transmission of the RLC-status-report.

In Release-12 of LTE, "Inter-eNB CA (Carrier Aggregation)" in which CA is executed between different radio base stations eNB has been under discussion and consideration in order to improve a throughput (for example, see non-patent document 1).

Additionally, an architecture shown in FIG. 6 has been under discussion and consideration as one of U-plane architectures in such "Inter-eNB CA".

In such architecture, a PDCP (Packet Data Convergence Protocol) layer function of a radio base station MeNB (Master-eNB) distributes downlink data addressed to a mobile station UE to a radio base station SeNB (Secondary-eNB), thereby achieving improvement of a throughput of such mobile station UE. Note that such distribution is referred as "Bearer split".

In such architecture, it should be noted that the PDCP layer function on the mobile station UE side needs to perform order correction processing on two RLC (Radio Link Control) streams.

PRIOR ART DOCUMENT

Non-Patent Document

Non-patent document 1: 3GPP TDocs (written contribution) R2-131782

SUMMARY OF THE INVENTION

Conventional LTE, however, is configured such that, when a radio base station eNB #1 in a state where a bearer #1 is established between the radio base station eNB #1 and a mobile station UE as shown in FIG. 7 (a) determines to execute "Bearer split" in "Inter-eNB CA" as shown in FIG. 7 (b), or in other words, determines to establish a bearer #2 having the same "configuration" as "configuration" of the bearer #1 between the mobile station UE and the radio base station eNB #2, the radio base station eNB #1 notifies the mobile station UE of all of "configuration" of the bearer #1. Accordingly, there is a problem that an overhead for signaling occurs.

Hence, the present invention is made in consideration of the above-mentioned problem, and an object of the present invention is to provide a mobile communication method, a mobile station, and a radio base station which are able to reduce the overhead for signaling in starting "Bearer split" in "Inter-eNB CA".

A first feature of the present invention is summarized as a mobile communication method including the steps of: transmitting, by a first radio base station, an identifier of a second radio base station and a setting replication instruction to a mobile station, the setting replication instruction instructing the mobile station to replicate a setting content of a first bearer when the first radio base station in a state where the first bearer is established with the mobile station determines to establish a second bearer between the mobile station and the second radio base station; and establishing, by the mobile station, the second bearer having the same setting content as the setting content of the first bearer between the second radio base station and the mobile station in accordance with the identifier of the second radio base station and the setting replication instruction.

A second feature of the present invention is summarized as the mobile station configured to be able to execute carrier aggregation using a first radio base station and a second radio base station, including a control unit configured to establish the second bearer having the same setting content as the setting content of the first bearer between the second radio base station and the mobile station, when an identifier of the second radio base station and a setting replication instruction which instructs the mobile station to replicate the setting content of the first bearer are received from the first radio base station while the first bearer is established with the first radio base station.

A third feature of the present invention is summarized as the radio base station which is able to operate as a first radio base station in the mobile communication system configured to enable the mobile station to execute carrier aggregation using the first radio base station and a second radio base station. The radio base station includes a transmission unit configured to transmit an identifier of the second radio base station and a setting replication instruction to the mobile station, the setting replication instruction instructing the mobile station to replicate the setting content of the first bearer, when the radio base station in the state where the first bearer is established with the mobile station determines to establish a second bearer between the mobile station and the second radio base station.

DETAILED DESCRIPTION (A Mobile Communication System According to an Embodiment of the Present Invention)

A mobile communication system according to an embodiment of the present invention is described with reference to FIGS. 1 to 5.

Figure 1:
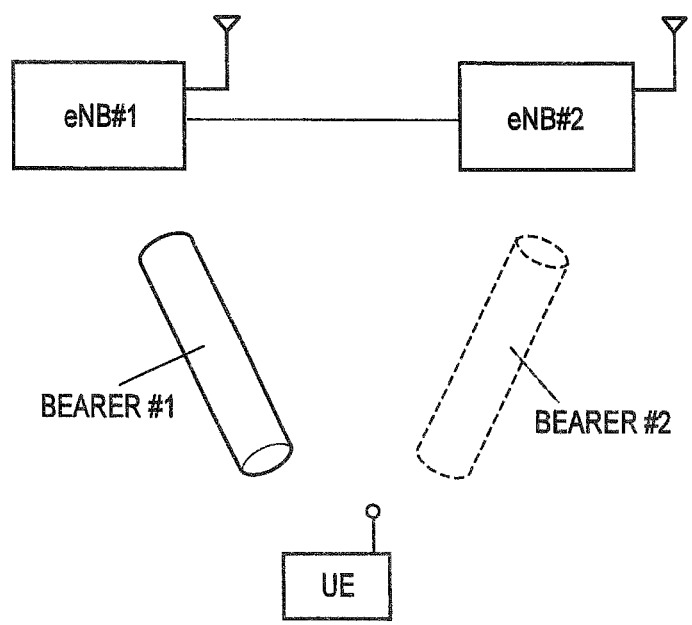
FIG. 1 is an overall configurational view of a mobile communication system according to an embodiment of the present invention.

The mobile communication system according to the present embodiment is a mobile communication system of LTE (or LTE-Advanced). As shown in FIG. 1, the mobile communication system is provided with a radio base station eNB #1 and a radio base station eNB #2.

For example, in the mobile communication system according to the present embodiment, the radio base station eNB #1 may be a radio base station MeNB which manages a macrocell, and the radio base station eNB #2 may be a radio base station SeNB which manages a small cell.

Note that, as shown in FIG. 1, the mobile communication system according to the present embodiment is described by taking as an example a case where the radio base station eNB #1 in a state where a bearer #1 is established between the radio base station eNB #1 and the mobile station UE determines to establish a bearer #2 between a mobile station UE and the radio base station eNB #2.

Figure 2:
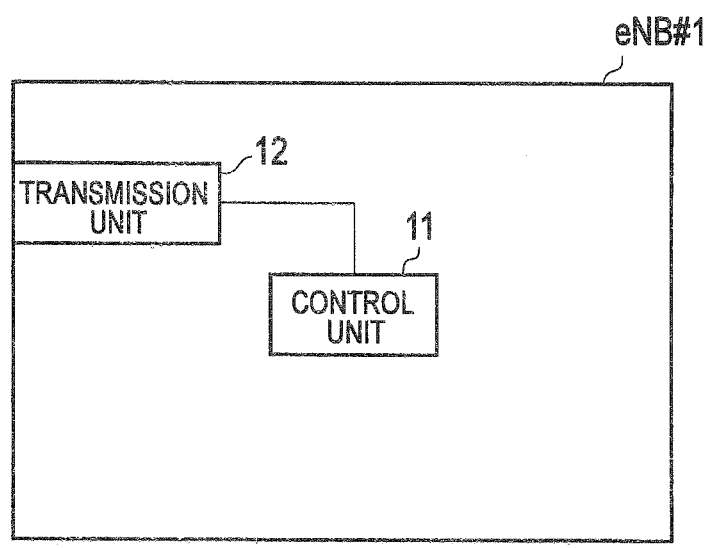
FIG. 2 is a functional block diagram of a radio base station according to the embodiment of the present invention.

As shown in FIG. 2, the radio base station eNB #1 according to the present embodiment is provided with a control unit 11 and a transmission unit 12.

The control unit 11 is configured to execute various controls for communications with the mobile station UE. The transmission unit 12 is configured to transmit various signals to the mobile station UE and the radio base station eNB #2.

For example, in the state where the above-mentioned bearer #1 is established, the control unit 11 is configured to determine to execute "Bearer split" in "Inter-eNB CA", or in other words to establish a bearer #2 between the mobile station UE and the radio base station eNB #2.

In such a case, the transmission unit 12 is configured to transmit an instruction to add the bearer #2 targeted for the above-mentioned "Bearer split", an identifier of the radio base station eNB #2 with which such bearer #2 should be added, and "Config copy indication" which instructs the mobile station UE to replicate "configuration" of the bearer #1 to the mobile station UE.

Note that, in such a case, if "configuration" of the bearer #2 is desired to be different from "configuration" of the bearer #1, the transmission unit 12 may be configured to transmit the instruction to add the bearer #2 targeted for the above-mentioned "Bearer split", the identifier of the radio base station eNB #2 with which such bearer #2 should be added, difference information from "configuration" of the bearer #1, and "Config uncopy indication" which instructs the mobile station UE not to replicate "configuration" of the bearer #1 to the mobile station UE.

In this case, if the mobile station UE receives the difference information from "configuration" of the bearer #1, the mobile station UE implicitly recognizes that "configuration" of the bearer #1 is not to be replicated. Therefore, in such a case, the transmission unit 12 may be configured so as not to transmit "Config uncopy indication".

Note that if the control unit 11 determines to execute "Bearer split" in "Inter-eNB CA" using three or more radio base stations eNB, the transmission unit 12 may be configured to transmit an identifier which indicates the radio base station eNB with which the bearer targeted for the above-mentioned "Bearer split" should be added.

Additionally, the transmission unit 12 may be configured to transmit "configuration" of the bearer #1 not only related to "RLC configuration", but also related to "LCH (Logical Channel) configuration" and the like.

In this case, the transmission unit 12 may be configured to separately transmit "configuration" of the bearer #1 with each type of configurations (for example, "RLC configuration" and "LCH configuration").

Figure 3:
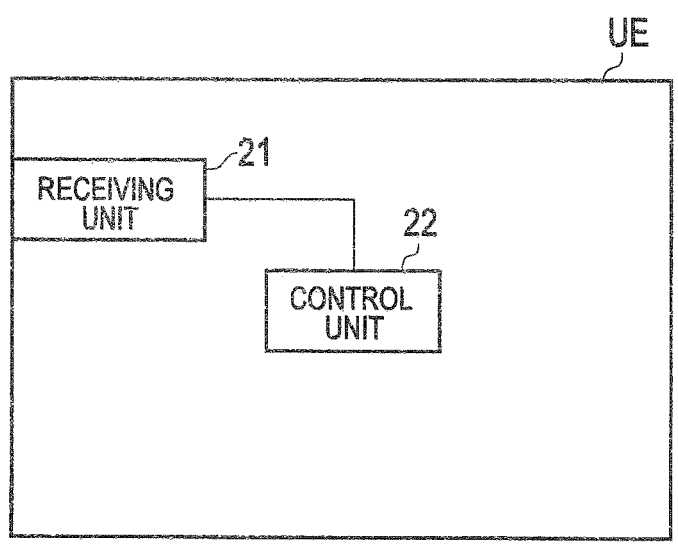
FIG. 3 is a functional block diagram of a mobile station according to the embodiment of the present invention.

The mobile station UE according to the present embodiment is configured to be able to execute "Inter-eNB CA" using the radio base station eNB #1 and the radio base station eNB #2. Additionally, as shown in FIG. 3, the mobile station UE is provided with a receiving unit 21 and a control unit 22.

The receiving unit 21 is configured to receive various signals from the radio base stations eNB #1/eNB #2. The control unit 22 is configured to execute various controls according to communications of the mobile station UE.

For example, while the bearer #1 is established between the mobile station UE and the radio base station eNB #1, the receiving unit 21 is configured to receive the instruction to add the bearer targeted for "Bearer split" in "Inter-eNB CA", the identifier of the radio base station eNB #2, and "Config copy indication" which instructs the mobile station UE to replicate "configuration" of the bearer #1 from the radio base station eNB #1.

In such a case, the control unit 22 is configured to replicate "configuration" of the bearer #1 without any changes and establish the bearer #2 having the same "configuration" as "configuration" of the bearer #1 between the mobile station UE and the radio base station eNB #2.

On the other hand, while the bearer #1 is established and if the receiving unit 21 receives the difference information from "configuration" of the bearer #1 instead of "Config copy indication" from the radio base station eNB #1, the control unit 22 may be configured to establish the bearer #2 based on such difference information and "configuration" of the bearer #1.

Hereinbelow, an example of a concrete operation of the mobile communication system according to the present embodiment is described with reference to FIGS. 4 and 5.

Firstly, the example of the operation of the mobile communication system according to the present embodiment is described with reference to FIG. 4.

Figure 4:
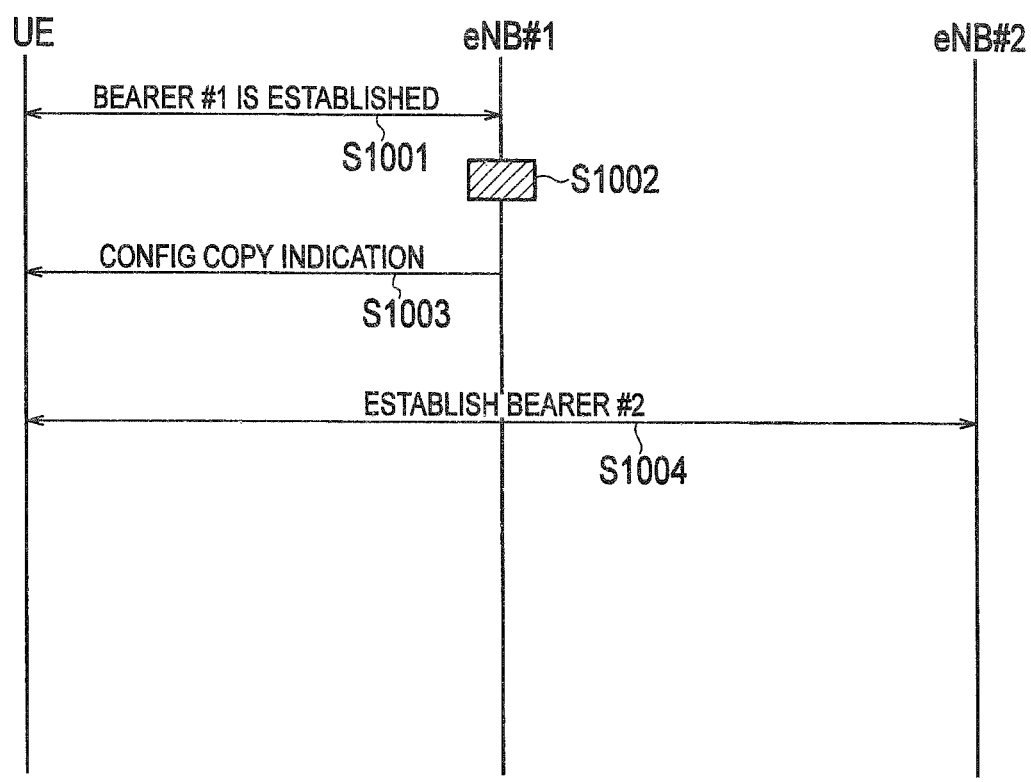
FIG. 4 is a sequence diagram to describe an operation of the mobile communication system according to the embodiment of the present invention.

As shown in FIG. 4, in a step S1001, the bearer #1 is established between the radio base station eNB #1 and the mobile station UE. In a step S1002, the radio base station eNB #1 determines to execute "Bearer split" in "Inter-eNB CA"; in other words, the radio base station eNB #1 determines to establish the bearer #2 between the mobile station UE and the radio base station eNB #2. In a step S1003, the radio base station eNB #1 transmits the instruction to add the bearer #2 targeted for the above-mentioned "Bearer split", the identifier of the radio base station eNB #2 with which such bearer #2 should be added, and "Config copy indication" which instructs the mobile station UE to replicate "configuration" of the bearer #1 to the mobile station UE.

In a step S1004, the mobile station UE replicates "configuration" of the bearer #1 without any changes and establishes the bearer #2 having the same "configuration" as "configuration" of the bearer #1 between the mobile station UE and the radio base station eNB #2.

Secondary, the example of the operation of the mobile station UE according to the present embodiment is described with reference to FIG. 5.

Figure 5:
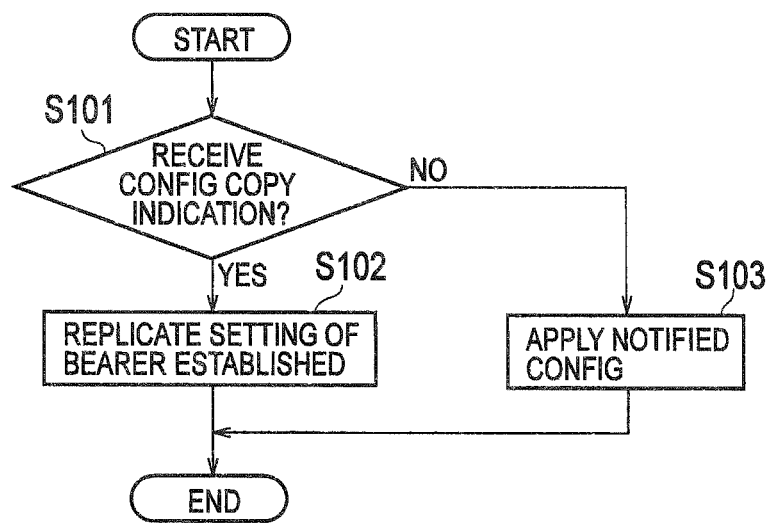
FIG. 5 is a flowchart to describe an operation of the mobile station according to the embodiment of the present invention.
Figure 6:
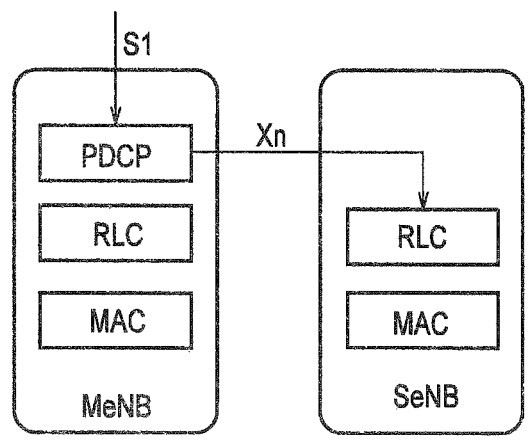
FIG. 6 is a diagram to describe an example of U-plane architecture in "Inter-eNB CA" from a conventional technology.
Figure 7:
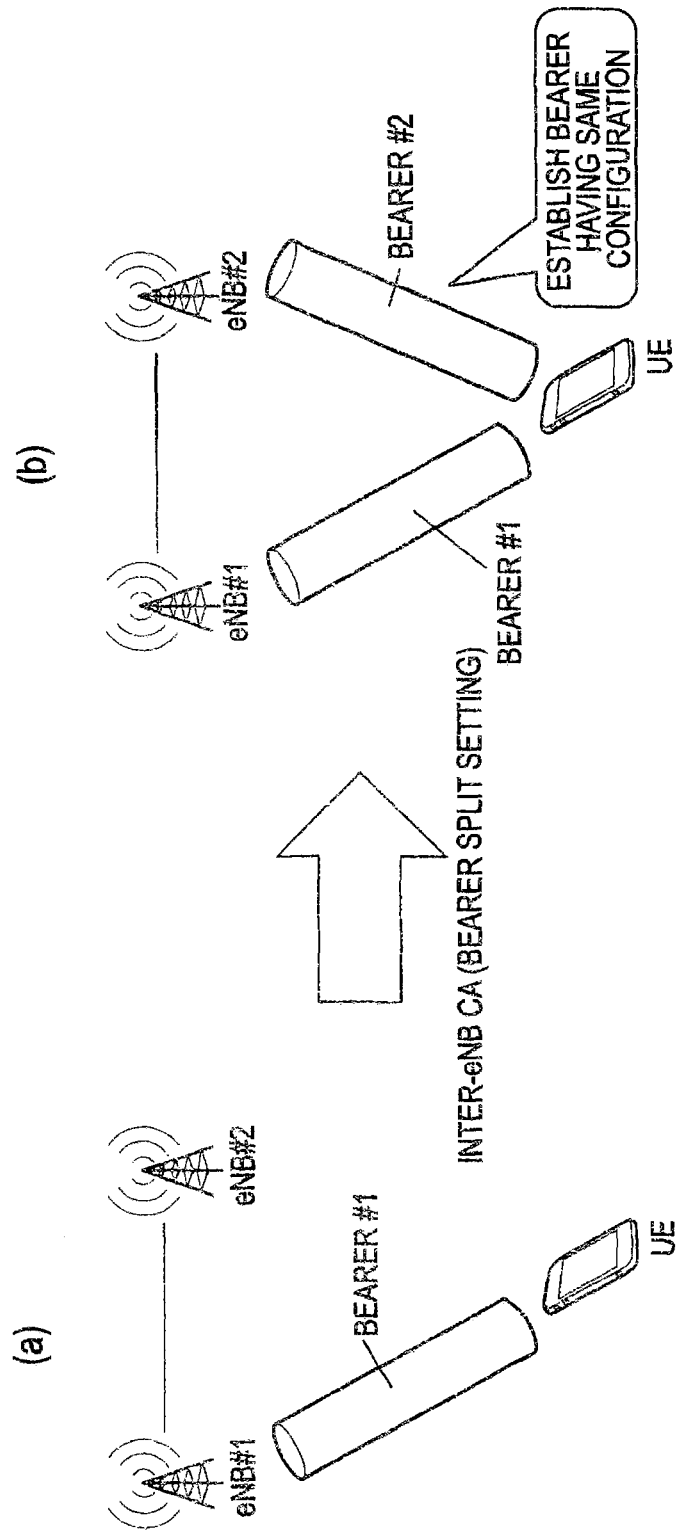
FIG. 7 is a diagram to describe setting of "Bearer split" in "Inter-eNB CA" from the conventional technology.

As shown in FIG. 5, in a step S101, the mobile station UE receives the instruction to add the bearer #2 targeted for the above-mentioned "Bearer split", the identifier of the radio base station eNB #2 with which such bearer #2 should be added, and "Config copy indication" which instructs the mobile station UE to replicate "configuration" of the bearer #1 from the radio base station eNB #1. In a step S102, the mobile station UE replicates "configuration" of the bearer #1 without any changes and establishes the bearer #2 having the same "configuration" as "configuration" of the bearer #1 between the mobile station UE and the radio base station eNB #2.

On the other hand, if the mobile station UE receives the instruction to add the bearer #2 targeted for the above-mentioned "Bearer split" without receiving the above-mentioned "Config copy indication" in the step S101, the mobile station UE establishes the bearer #2 which has "configuration" notified of by the radio base station eNB #1.

The features of the present embodiment mentioned above may be expressed as below.

A first feature of the present embodiment is summarized as a mobile communication method including the steps of: transmitting, by a radio base station eNB #1 (a first radio base station), an identifier of a radio base station eNB #2 (a second radio base station) and "Config copy indication (a setting replication instruction)" to a mobile station, "Config copy indication" instructing the mobile station UE to replicate "configuration (a setting content)" of a bearer #1 (a first bearer) when the radio base station eNB #1 in a state where the bearer #1 is established with the mobile station UE determines to establish a bearer #2 (a second bearer) between the mobile station UE and the radio base station eNB #2; and establishing, by the mobile station, the bearer #2 having the same "configuration" as "configuration" of the bearer #1 between the radio base station eNB #2 and the mobile station UE in accordance with the identifier of the radio base station eNB #2 and "Config copy indication".

According to such feature, an overhead for signaling in starting "Bearer split" in "Inter-eNB CA" can be reduced since the radio base station eNB #1 does not need to notify the mobile station UE of all of "configuration" of bearer #1.

A second feature of the present embodiment is summarized as the mobile station configured to execute "Inter-eNB CA (carrier aggregation)" using the radio base station eNB #1 and the radio base station eNB #2, including a control unit 22 configured to establish the bearer #2 having the same "configuration" as "configuration" of the bearer #1 between the radio base station eNB #2 and the mobile station UE, when the identifier of the radio base station eNB #2 and "Config copy indication" which instructs the mobile station UE to replicate "configuration" of the bearer #1 are received from the radio base station eNB #1 while the bearer #1 is established with the radio base station eNB #1.

According to such feature, an overhead for signaling in starting "Bearer split" in "Inter-eNB CA" can be reduced since the radio base station eNB #1 does not need to notify the mobile station UE of all of "configuration" of bearer #1.

In the second feature of the present embodiment, when difference information from "configuration" of the bearer #1 instead of "Config copy indication" is received from the radio base station eNB #1 while the bearer #1 is established, the control unit 22 may be configured to establish the bearer #2 based on "configuration" of the bearer #1 and the difference information.

According to such feature, "configuration" of the bearer #1 and "configuration" of the bearer #2 can be made different if needed when starting "Bearer split" in "Inter-eNB CA".

A third feature of the present embodiment is summarized as a radio base station eNB which is able to operate as the radio base station eNB #1 in the mobile communication system configured to enable the mobile station UE to execute "Inter-eNB CA" using the radio base station eNB #1 and the radio base station eNB #2, the radio base station eNB including a transmission unit 12 configured to transmit the identifier of the radio base station eNB #2 and "Config copy indication" to the mobile station UE, "Config copy indication" instructing the mobile station UE to replicate "configuration" of the bearer #1, when the radio base station eNB in a state where the bearer #1 is established with the mobile station UE determines to establish the bearer #2 between the mobile station UE and the radio base station eNB #2.

According to such feature, an overhead for signaling in starting "Bearer split" in "Inter-eNB CA" can be reduced since the radio base station eNB #1 does not need to notify the mobile station UE of all of "configuration" of bearer #1.

According to the third feature of the present embodiment, the transmission unit 12 may be configured to make an instruction by "Config copy indication" to replicate "RLC configuration (a setting content of an RLC)" and "LCH configuration (a setting content of an LCH)" as "configuration" of the bearer #1.

According to the third feature of the present embodiment, the transmission unit 12 may be configured to separately transmit "Config copy indication" making an instruction to replicate "RLC configuration" and "Config copy indication" making an instruction to replicate "LCH configuration".

It should be noted that the foregoing operations of the mobile station UE and the radio base stations eNB #1/eNB #2 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base stations eNB #1/eNB #2. Otherwise, the storage medium and the processor may be provided as discrete components inside the mobile station UE and the radio base stations eNB #1/eNB #2.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-226944 (filed on Oct. 31, 2013) is incorporated by reference in the present specification.

INDUSTRIAL APPLICABILITY

As described above, according to the present invention, it is possible to provide a mobile communication method, a mobile station, and a radio base station which are able to reduce an overhead for signaling in starting "Bearer split" in "Inter-eNB CA".

EXPLANATION OF THE REFERENCE NUMERALS

UE mobile station
eNB #1, eNB #2 radio base station
11, 22 control unit
12 transmission unit
21 receiving unit

The invention claimed is:

1. A mobile communication method comprising:
transmitting, by a first radio base station, a setting replication instruction to a mobile station, the setting replication instruction instructing the mobile station to establish a second bearer with a second radio base station by replicating a setting content of a first bearer established with the first radio base station; and
establishing, by the mobile station, the second bearer having the same setting content as the setting content of the first bearer between the second radio base station and the mobile station in accordance with the setting replication instruction,
wherein the transmitting makes an instruction with the setting replication instruction to replicate a setting content of an RLC and a setting content of an LCH as the setting content of the first bearer, and
wherein the transmitting separately transmits the setting replication instruction making an instruction to replicate the setting content of the RLC and the setting replication instruction making an instruction to replicate the setting content of the LCH.

2. A mobile station configured to be able to execute carrier aggregation using a first radio base station and a second radio base station, comprising:
a receiver that receives a setting replication instruction from the first radio base station, the setting replication instruction making an instruction to establish a second bearer with the second radio base station by replicating a setting content of a first bearer established with the first radio base station; and
a processor that establishes the second bearer having the same setting content as the setting content of the first bearer between the second radio base station and the mobile station in accordance with the setting replication instruction,
wherein the processor replicates a setting content of an RLC and a setting content of an LCH as the setting content of the first bearer in accordance with the setting replication instruction, and
wherein the receiver separately receives the setting replication instruction making an instruction to replicate the setting content of the RLC and the setting replication instruction making an instruction to replicate the setting content of the LCH.

3. The mobile station according to claim 2, wherein when the receiver receives difference information from the setting content of the first bearer from the first radio base station, the processor establishes the second bearer based on the setting content of the first bearer and the difference information.

4. A radio base station which is able to operate as a first radio base station in a mobile communication system configured to enable a mobile station to execute carrier aggregation using the first radio base station and a second radio base station,
the radio base station comprising:
a processor that controls communication with the mobile station; and
a transmitter that transmits a setting replication instruction to the mobile station, the setting replication instruction instructing the mobile station to establish a second bearer with the second radio base station by replicating a setting content of a first bearer established with the first radio base station,
wherein the transmitter makes an instruction with the setting replication instruction to replicate a setting content of an RLC and a setting content of an LCH as the setting content of the first bearer, and
wherein the transmitter separately transmits the setting replication instruction making an instruction to replicate the setting content of the RLC and the setting replication instruction making an instruction to replicate the setting content of the LCH.

* * * * *